Jan. 21, 1930.  W. C. ZAGARINO ET AL  1,744,064
BATTERY CONDITION INDICATOR
Filed May 22, 1928

INVENTORS
WILLIAM C. ZAGARINO.
MARSHALL T. McDONALD.
BY
ATTORNEY

Patented Jan. 21, 1930

1,744,064

UNITED STATES PATENT OFFICE

WILLIAM C. ZAGARINO AND MARSHALL T. McDONALD, OF BELLMORE, NEW YORK

BATTERY-CONDITION INDICATOR

Application filed May 22, 1928. Serial No. 279,832.

Our invention relates to storage batteries, and more particularly to a device for enabling the operator to maintain the electrolyte at the proper level, and to means for indicating such level.

Heretofore, it has been necessary to remove the vent or filler plugs of the battery, and determine the level of the electrolyte in each cell by looking therein thru the filler plug openings. Such practice is often inconvenient and undesirable due to the inaccessibility of the battery, in some cases, and because of accumulations of acid, dirt, etc., usually present on the plugs. For this reason many batteries are neglected, and are irrepairably damaged by the failure to keep the electrolyte level above the battery plates.

In the present invention a device incorporated in the battery itself is made to register the electrolyte level in a manner such that a positive warning is given to the observer when and as the level of the electrolyte falls below that level required for correct operation of the battery. Such indication is given automatically without the necessity of removing the filler plugs or handling the battery in any way.

A further object of the invention is to provide a remote indicating attachment to the device so that the operator or observer may determine, by observation, the condition of the battery. Where a battery thus equipped is used on or in connection with an automotive vehicle, such as an automobile, the indicating attachment is preferably mounted on the dash or instrument board thereof.

A still further object of the invention is to use the energy of the battery itself in operating the indicating attachment so that the unit will be completely self-contained and operative in conjunction with the battery.

A device or battery condition indicator characterized as above set forth, when used as an accessory, is adapted to supplant the standard type filler plug furnished with storage batteries now in use.

Other objects and advantages of the invention will be hereinafter more fully explained.

Figure 1:
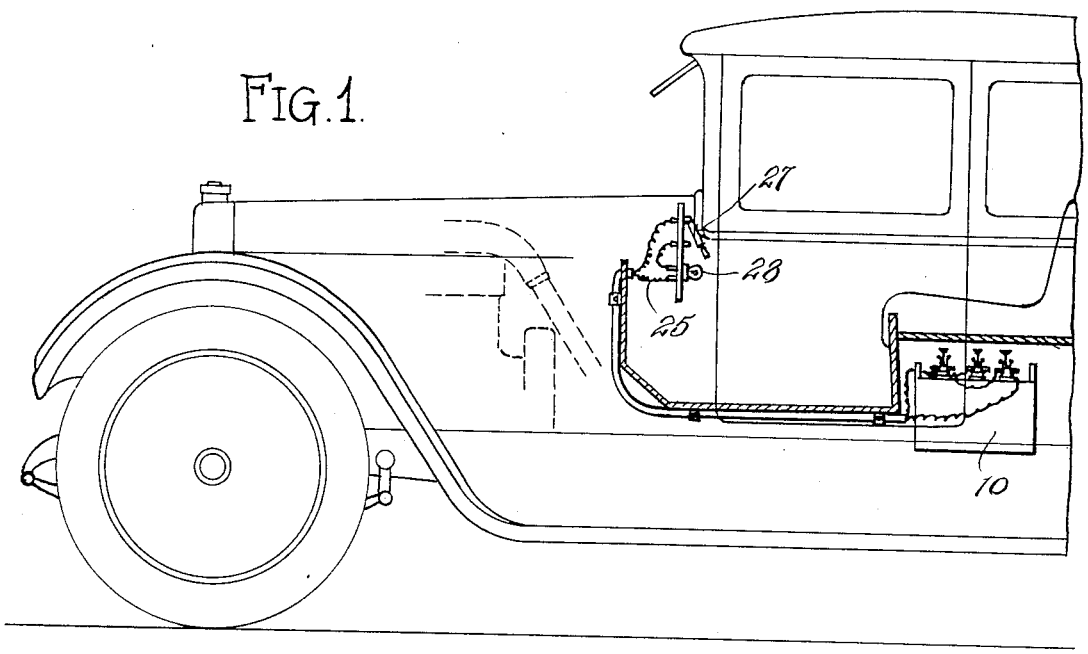
Figure 3:
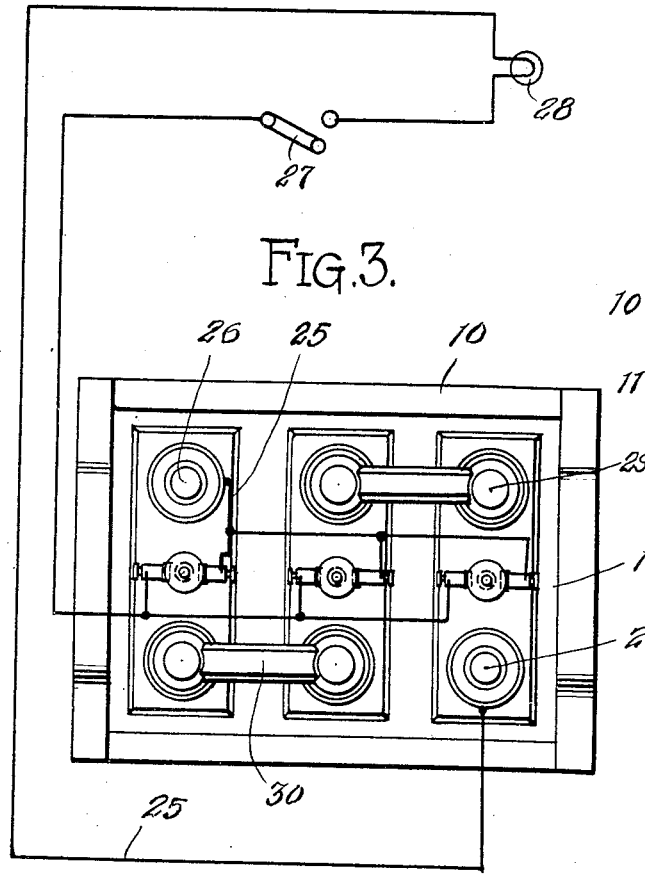
Figure 2:
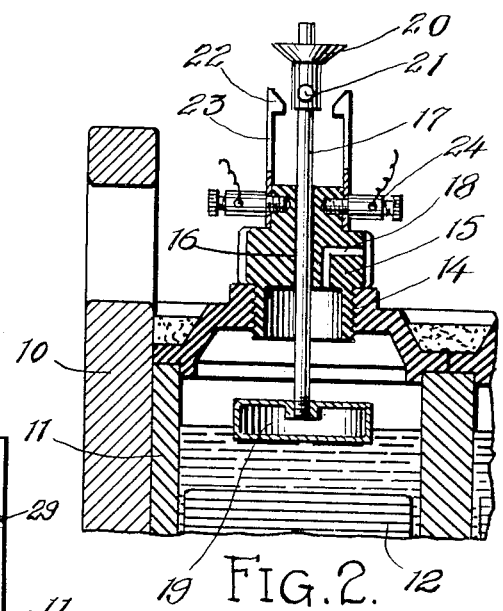

In the drawings, wherein like reference characters denote like or corresponding parts, Fig. 1 is a side elevation showing the preferred installation of the battery condition indicator on an automobile;

Fig. 2 is a diagrammatic cross-section of the upper part of a multiple cell storage battery showing the device (likewise in section) as it appears in use, and Fig. 3 is a plan view of a typical multiple cell storage battery showing the device in place in each battery cell and showing diagrammatically, one method of incorporating a remote indicating attachment.

In the embodiment of the invention selected for illustration (see Fig. 1) the preferred arrangement is shown. It is not intended, however, that the invention shall be limited to any particular type or any specific use, as certain modifications and uses, within the scope of the invention readily suggest themselves to those skilled in the art, such, for instance, as remote indicators for use with radio batteries, where such batteries are removed from the radio receiving or sending apparatus itself; remote indicators, or direct attached indicators on home lighting plant storage batteries, and the like.

Referring to Fig. 2, the battery container box is indicated at 10 and the individual battery cells at 11. The positive and negative plates and their separators (12) are shown immersed in the electrolyte, which electrolyte is illustrated at its approximately correct operating level. The opening 14 is the usual threaded vent or filler plug opening formed in all batteries. Plug 15, which may be constructed of hard rubber or other material not effected by the acid in the battery, is the attachment plug which secures the device in place on the battery either by screwing into the opening 14 or by attachment in an opening especially provided to receive it.

The attachment plug 15 is provided with an opening 16 thru which the sliding rod 17 is free to move vertically. Said opening 16 may be of sufficiently greater diameter than the rod 17 to provide a vent or exit for the escaping battery gases, or, if desired, a bypass 18 may be used. A float 19 is attached to the lower end of the slide rod 17. This float, which may be made in any desired manner, and preferably of acid resisting material, has sufficient displacement to cause the unit composed of the float 19, the slide rod 17, and the contact maker 20, to float upright in the electrolyte by means of the guide opening 16 in the plug. Contact maker 20 is removable from the rod 17 in order to permit of assembly of the float 19 and rod 17 thru the opening 16. It is also adjustable, vertically, on the rod 17, and is locked in any desired position of adjustment by the set screw 21.

Contacts 22 are mounted on flexible conductor strips 23, and are fastened to the attachment plug 15, by binding posts 24. A wire 25 is run from one binding post 24 to one terminal 26 of the battery. From the other binding post 24 a wire is run to a switch 27, and from the switch to the signal light 28, and then completing the electrical circuit by its attachment to the other battery terminal 26. It is also understood that the lead wires 25 may be connected to the other cell terminals 29, or their connector straps 30, depending upon the amount of voltage required for the light 28. As shown in Fig. 3, the component parts, including the remote indicator light 28 and the switch 27 may be located in some convenient place such as the dash or instrument board of an automobile or other automotive vehicle.

It will be readily understood by an examination of Fig. 2, that the lowering of the level of the electrolyte by evaporation or other causes will allow the float 19 and its attached sliding rod 17 and contact maker 20 to lower a corresponding amount. A proper adjustment and location of contact maker 20 by means of the set screw 21 will therefore close the electrical circuit between contacts 22 and the binding posts 24 when the electrolyte shall have fallen below a predetermined level. The operator, upon desiring to ascertain the condition of the battery, closes the switch 27. If the light 28 is lighted, it is an indication that the electrolyte in one or the other of the battery cells is low. If the light remains off, the electrolyte is sufficient in all cells for a proper and continued battery operation.

It is of course understood that the switch 27 may or may not be incorporated in the electrical circuit according to whether or not the indicator is desired to register automatically or just at such time as the operator may desire. It is also understood that the wiring circuit 25 may be such as to indicate, by a separate light for each cell, the individual condition of each cell, or a similar result may be obtained by multiple wiring incorporating one master light and a separate switch for each cell.

The scope of the invention is also such as to include other indicating means, as for instance, the ringing of a bell, to indicate the drop in the level of the electrolyte. It is further understood that the indicating light or other device may be directly attached to the plug unit itself if a remote indicator is not desired.

From the foregoing detailed description of our invention in several of its operative embodiments, the numerous uses and advantages are readily ascertainable. It is also equally obvious after understanding our invention that various changes and modifications may be made therein without departing from the spirit or scope thereof. We aim in the appended claim to cover all such modifications and changes.

What we claim is:

In a battery condition indicator, a plug of insulating material having an opening extending therethru, spring contacts disposed one each at opposite sides of said plug to extend beyond the outer end thereof, an electrical circuit including a binding post for each said contact, each said binding post being let thru one said contact to hold said contacts against said plug, an indicating means within said electrical circuit, a rod extending thru said plug opening, said rod at its outer end being carried well beyond the corresponding end of each said contact, a float upon the inner end of said rod, and a contact adjustable upon the outer end of said rod to vary the gap between said contacts, said adjustable contact being movable with said rod under the influence of the rise and fall of said float to make and break said electrical circuit.

In testimony whereof we hereunto affix our signatures.

WILLIAM C. ZAGARINO.
MARSHALL T. McDONALD.